United States Patent
Fogel et al.

(10) Patent No.: US 7,414,637 B2
(45) Date of Patent: *Aug. 19, 2008

(54) PLACEMENT OF MAP LABELS

(75) Inventors: Efraim Fogel, Tel Aviv (IL); Eran Leiserowitz, Ramat-Gan (IL); Michael Menachem Kupfeman, Zichron Ya'akov (IL); Alexander E. Fagin, Lod (IL)

(73) Assignee: Telmap Ltd., Harzlia (IL)

( * ) Notice: Subject to any disclaimer, the term of this patent is extended or adjusted under 35 U.S.C. 154(b) by 63 days.

This patent is subject to a terminal disclaimer.

(21) Appl. No.: 10/938,075

(22) Filed: Sep. 10, 2004

(65) Prior Publication Data

US 2006/0058949 A1    Mar. 16, 2006

(51) Int. Cl.
*G09G 5/377* (2006.01)
*G09G 5/00* (2006.01)
*G01C 21/32* (2006.01)

(52) U.S. Cl. .................. 345/629; 345/619; 701/208; 701/200

(58) Field of Classification Search ............. 345/619, 345/672, 629; 715/517–519, 521; 701/208, 701/200
See application file for complete search history.

(56) References Cited

U.S. PATENT DOCUMENTS

| | | | | |
|---|---|---|---|---|
| 3,882,446 | A * | 5/1975 | Brittian et al. ............. 367/71 |
| 4,571,684 | A * | 2/1986 | Takanabe et al. ............ 701/200 |
| 5,355,314 | A | 10/1994 | Feigenbaum |
| 5,689,717 | A | 11/1997 | Pritt |
| 5,724,072 | A * | 3/1998 | Freeman et al. ............. 345/648 |
| 5,805,118 | A * | 9/1998 | Mishra et al. ............. 345/1.1 |
| 5,988,853 | A * | 11/1999 | Kim et al. .................. 700/90 |
| 6,038,559 | A | 3/2000 | Ashby et al. |
| 6,124,864 | A * | 9/2000 | Madden et al. ............. 345/473 |
| 6,160,907 | A * | 12/2000 | Robotham et al. .......... 382/154 |
| 6,565,610 | B1 * | 5/2003 | Wang et al. ................. 715/517 |
| 6,598,054 | B2 * | 7/2003 | Schuetze et al. ........ 707/103 R |
| 6,643,650 | B1 | 11/2003 | Slaughter et al. |
| 6,678,535 | B1 | 1/2004 | Narayanaswami |
| 6,747,649 | B1 * | 6/2004 | Sanz-Pastor et al. ........ 345/428 |
| 6,826,385 | B2 | 11/2004 | Kujala |
| 6,834,195 | B2 | 12/2004 | Brandenberg et al. |

(Continued)

FOREIGN PATENT DOCUMENTS

EP    1 186 863    3/2002

OTHER PUBLICATIONS

J. Christensen, et al, "An Empirical Study of Algorithms for Point-feature Label Placement", ACM Transactions on Graphics, 14(3): 203-232, 1995.

(Continued)

*Primary Examiner*—Javid A Amini
(74) *Attorney, Agent, or Firm*—Welsh & Katz, Ltd.

(57) ABSTRACT

Methods and systems are presented for the automatic optimal placement text or symbol labels corresponding to graphical objects on maps. Using a map server and a thin, typically mobile client, maps are dynamically drawn and displayed at the client. Optimized labeling of map objects is achieved by dividing the task into pipelined subtasks, some being performed off-line, and others being performed in real time, responsively to changing client requests, and changes in the map viewport. Optimization of candidate label positions is accomplished using simulated annealing.

28 Claims, 4 Drawing Sheets

U.S. PATENT DOCUMENTS

| | | | |
|---|---|---|---|
| 6,854,115 | B1 | 2/2005 | Traversat et al. |
| 6,898,516 | B2* | 5/2005 | Pechatnikov et al. ........ 701/202 |
| 6,931,429 | B2 | 8/2005 | Gouge et al. |
| 6,934,755 | B1 | 8/2005 | Saulpaugh et al. |
| 6,970,869 | B1 | 11/2005 | Slaughter et al. |
| 7,117,266 | B2 | 10/2006 | Fishman et al. |
| 2001/0026271 | A1* | 10/2001 | Higgins et al. .............. 345/213 |
| 2002/0111146 | A1 | 8/2002 | Fridman et al. |
| 2003/0117297 | A1 | 6/2003 | Obradovich et al. |
| 2004/0058652 | A1 | 3/2004 | McGregor et al. |
| 2005/0021876 | A1 | 1/2005 | Asai et al. |
| 2006/0061595 | A1* | 3/2006 | Goede et al. ................ 345/619 |

OTHER PUBLICATIONS

S. Edmondson, et al, "A General Cartographic Labeling Algorithm", Cartographica, 33(4): 13-23, 1997.

E. Imhof, "Positioning Names on Maps", The American Cartographer, 2(2): 128-144, 1975.

K.G. Kakoulis, et al, "A Unified Approach to Labeling Graphical Features", In Proc. 14th Annu. ACM Sympos. Comput. Geom. (SoCG' 98), pp. 347-356, Jun. 1998.

S. Zoraster, "Integer Programming Applied to the Map Label Placement Problem", Cartographica, 23(3): 16-27, 1986.

S. Zoraster, "The Solution of Large 0-1 Integer Programming Problems Encountered in Automated Cartography", Operations Research, 38(5): 752-759, 1990.

S. Zoraster, "Practical Results Using Simulated Annealing for Point Feature Label Placement", Cartography and GIS, 24(4): 228-238, 1997.

S. Edmondson, et al, "A General Cartographic Labeling Algorithm", MERL—A Mitsubishi Electric Research Laboratory, Dec. 19, 1996.

K.G. Kakoulis, et al, "A Unified Approach to Labeling Graphical Features", The University of Texas at Dallas, Department of Computer Science, 1998, pp. 347-356.

Steven Van Dijk, et al, "Robust Genetic Algorithms for High Quality Map Labeling", Dec. 9, 1998.

EverName™, Capnographic Label Placement Software for Mapinfo Professional, Dec. 2004.

Maplex—Automatic Cartographic Name Placement Software, An ESRI White Paper, Aug. 1998.

H. Kang, et al, "Using Shape Analyses for Placement of Polygon Labels", Jan. 2004.

"Platform Abstraction of Input Method Using Proxy Server", IBM Technical Disclosure Bulletin, IBM Corp. New York, U.S. vol. 40, No. 4, Apr. 1997.

International Search report cited in PCT/IL05/00892, Sep. 9, 2006.

* cited by examiner

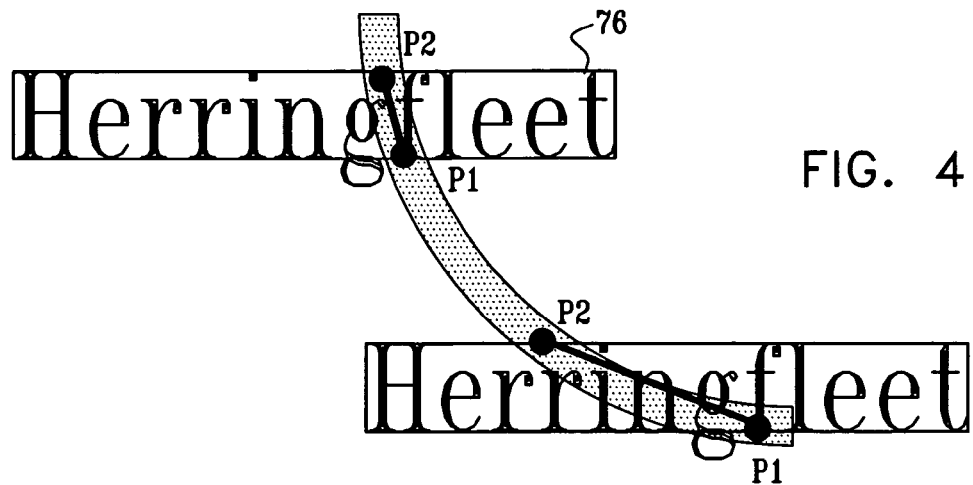
FIG. 4
FIG. 5
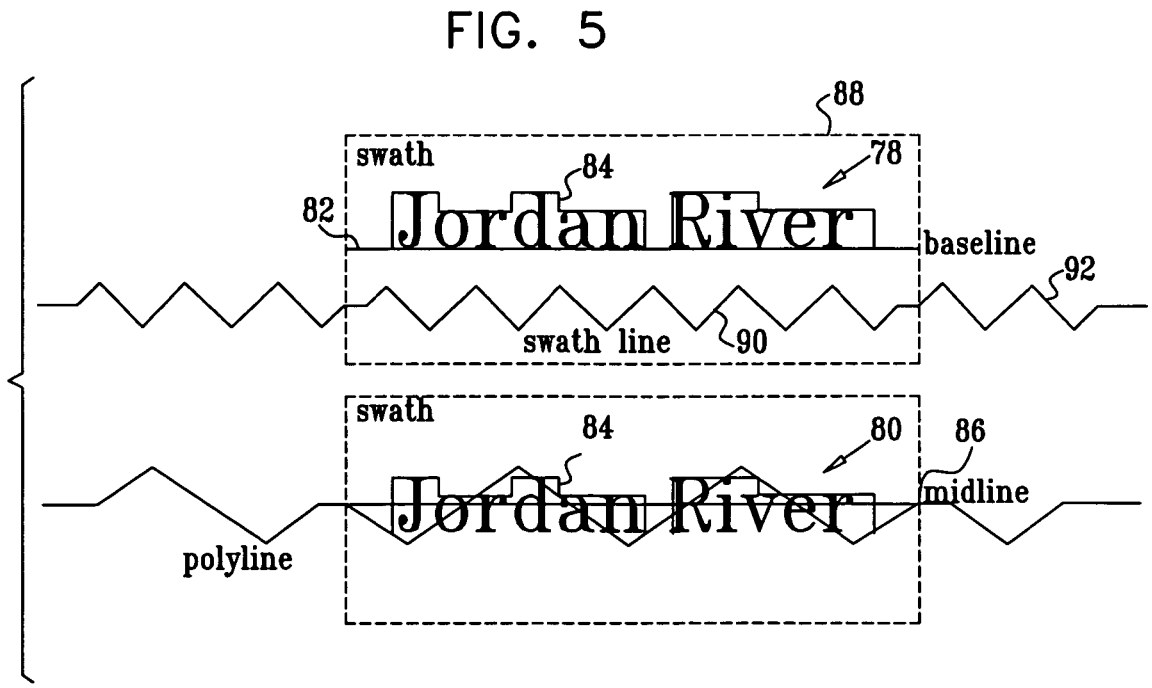

PLACEMENT OF MAP LABELS

BACKGROUND OF THE INVENTION

1. Field of the Invention

This invention relates to map display systems and methodologies. More particularly, this invention relates to the near optimum placement of cartographic labels.

2. Description of the Related Art

Map labeling involves determining a near optimal placement of labels that identify various cartographic features. Typically when drawing a map, there are requirements to label points such as cities, lines such as rivers or political borders, and real features such as swamps, parks or forests. The art of cartography has a long history, and label placement, being part of this art, does not fall short. For many centuries, cartographers have devised some general rules that a well-formed label placement must follow. Labels must be positioned such that they are legible and follow aesthetic quality criteria. A label must be placed in the best position among all legible positions. Labels should, in spite of their incorporation into densely crowded graphics of the map, be easily read, easily discriminated from other labels, and quickly located. The label must permit associativity. That is, the label and the object to which it belongs should be easily associated. A principle of noninterference must be observed. Labels should disturb other map contents as little as possible. Finally, labels should assist the reader to identify spatial situations, territorial extent, connections, importance, and to differentiate objects.

While there are many possible ways to label map features and to resolve conflicts, a well-formed labeling should result in a legible and attractive map that provides easy access to its information. Optimizing label placement in general is a difficult problem for which closed form solutions are either impractical or simply not available.

In map production, the problems of placing labels of a set of nodes or points are referred to as the "node label placement problem" (NLP), and the "point feature label placement problem", respectively. The problem of placing labels of lines or edges is referred to as the "edge label placement problem" (ELP). A related problem is the placement of area labels or face labels. All three problems are NP-hard. Therefore, algorithms based on exhaustive search are impractical due to exponential explosion, even when attempting to solve the problems independently. These three problems are referred to collectively as the "graphical feature label placement problem" (GFLP).

While the particular heuristics that have been used to resolve label conflicts vary, all depend upon three important assumptions: (1) Each individual label can be placed in one of a relatively small number of positions near or on the feature it annotates. The search for a new label position may be an iterative process, but only a few positions for each label are typically evaluated by most label placement algorithms. (2) The relative quality of individual label positions can be measured. (3) Each label should be placed relative to its feature in the best possible position that avoids overlapping with other labels or map symbols. Essentially, the GFLP is a combinatorial optimization problem.

Approaches that have been proposed to solve the map labeling problems are based on greedy algorithms, algorithms that simulate physical models, and algorithms that reduce the labeling problem to a variant of zero-one integer programming, such as relaxation methods, e.g., Lagrangian relaxation methods.

Using physical relaxation methods, labels are moved smoothly in response to virtual forces generated by label-label and label-symbol overlaps, while remaining tethered to the symbols they tag.

Using zero-one integer programming, scores associated with each label's candidate positions are refined iteratively to better reflect the merit of different label positions.

In gradient descent methods, a randomly generated labeling is improved monotonically by considering all alternative positions for each label, chosen from a discrete set, and making the single label move in a manner that most improves the global quality of the map labeling.

Genetic algorithms have also been applied to map labeling optimization. Genetic algorithms are iterative techniques, based on the paradigm of Darwinian evolution, and changes between iterations are not restricted to gradient descent but rather include a degree of randomness. Techniques based on genetic algorithms require careful tuning, as they are prone to converge on local optima.

Simulated annealing is another variant of the gradient descent technique, in which single label moves that worsen the quality of the labeling are performed occasionally in order to avoid becoming entrapped by local optima.

Formerly, map labels could be optimized more or less at leisure, using off-line approaches. However, systems for providing drivers with in-vehicle electronic routing maps and navigation aids have emerged. These systems are commonly coupled to a location-finding device in the vehicle, such as a Global Positioning System (GPS) receiver. The GPS receiver automatically determines the current location of the vehicle, to be displayed on the map and used in determining routing instructions. In-vehicle navigation systems fall into two general categories: "on-board" systems, in which the map data are stored electronically in the vehicle (typically on optical or magnetic media); and "off-board" systems, in which the map data are furnished by a remote map server. These systems typically use a client program running on a smart cellular telephone or personal digital assistant (PDA) in the vehicle to retrieve information from the server over a wireless link, and to display maps and provide navigation instructions to the driver. The off-board systems are particularly versatile, but may require the dynamic production of maps responsively to changing location information transmitted by the vehicle to the remote map server. This can place a significant computational burden on the remote map server.

The above-noted methods reflect progress in solving each component of the graphical feature label placement problem individually, but there is as yet no suitable integrated method that solves both of the graphical feature label placement problems simultaneously and in reasonable time so as to satisfy modern requirements.

SUMMARY OF THE INVENTION

Methods and systems are presented, according to a disclosed embodiment of the invention, for the automatic optimal placement text or symbol labels corresponding to graphical objects on maps. Using a map server and a thin, typically mobile client, maps are dynamically drawn and displayed at the client. Optimized labeling of map objects is achieved in near real-time by dividing the task into pipelined subtasks, some being performed off-line, and others being performed immediately, responsively to changing client requests, and changes in the map viewport. Optimization of label placement can be accomplished using simulated annealing and simulated quenching.

The invention provides a method of automatically situating labels on a map, which is carried out in a first subtask by identifying a set of candidate positions for labels of the features. The method is further carried out in a second subtask, by selecting initial candidate positions for each of the features. The method is further carried out in a third subtask by evaluating different candidate positions in comparison with the initial candidate positions to define a labeling, and responsively to the evaluation, replacing at least a portion of the initial candidate positions with corresponding different ones of the candidate positions so as to optimize a quality function of the labeling. The first subtask, the second subtask, and the third subtask each comprise a static phase and a real-time phase that is executed subsequent to the static phase, responsively to data produced in the static phase.

According to one aspect of the method, the static phase of the first subtask, the static phase of the second subtask, and the static phase of the third subtask comprise concurrently executing first computer processes, data being exchanged among the first computer processes during performance thereof.

According to still another aspect of the method, the real-time phase of the first subtask, the real-time phase of the second subtask, and the real-time phase of the third subtask comprise concurrently executing second computer processes, data being exchanged among the second computer processes during performance thereof.

According to one aspect of the method, the second computer processes are shared between a first computer and a second computer that is linked to the first computer, real-time data being exchanged therebetween.

According to another aspect of the method, the third subtask is performed iteratively by simulated annealing.

According to a further aspect of the method, the third subtask is performed iteratively by simulated quenching.

In yet another aspect of the method the set of candidate positions includes a virtual candidate position. Labels that correspond to the virtual candidate positions are omitted, when the virtual candidate positions are included in a final version of the labeling.

An additional aspect of the method includes determining the number of overlaps between a first label position and other label positions of the labeling, identifying a viewport of the map, and culling the candidate positions of the features that fall outside the viewport.

Yet another aspect of the method includes identifying pairs of intersections between the candidate positions, and thereafter generating a linked list of overlaps between one of the candidate positions and the other candidate positions.

According to still another aspect of the method, a count of the overlaps is determined using a sweep line algorithm.

According to an additional aspect of the method, a count of the overlaps is determined by counting overlaps between a super bounding box one candidate position and super bounding boxes of the other candidate positions of the linked list.

In one aspect of the method the map features include an real feature, and an evaluation of the quality function comprises constructing a polygon that describes the real feature, constructing a skeleton of the polygon, constructing a bounding rectangle of a candidate position of the real feature, and determining the distance between a center of the bounding rectangle and the skeleton.

In another aspect of the method the steps of constructing a polygon, constructing a skeleton, and constructing a bounding rectangle are performed during the static phase and include defining a cropped polygon as a portion of the polygon, thereafter constructing an inset polygon in the cropped polygon, and determining whether one of the labels of the real feature, when centered at any point in the inset polygon, lies entirely within the cropped polygon.

A further aspect of the method includes computing a medial axis transformation of the polygon.

Yet another aspect of the method includes decomposing the polygon into a plurality of simple polygons, wherein the medial axis transformation includes a union of medial axis transformations of the simple polygons.

According to still another aspect of the method, the candidate positions are centered on quasirandom points that are distributed throughout the polygon.

The invention provides a computer software product, including a computer-readable medium in which computer program instructions are stored, which instructions, when read by inter-connected computers, cause the computers to cooperatively perform a method of automatically situating labels on a map, which is carried out in a first subtask by identifying a set of candidate positions for labels of the features. The method is further carried out in a second subtask, by selecting initial candidate positions for each of the features. The method is further carried out in a third subtask by evaluating different candidate positions in comparison with the initial candidate positions to define a labeling, and responsively to the evaluation, replacing at least a portion of the initial candidate positions with corresponding different ones of the candidate positions so as to optimize a quality function of the labeling. The first subtask, the second subtask, and the third subtask each comprise a static phase and a real-time phase that is executed subsequent to the static phase, responsively to data produced in the static phase.

The invention provides a system for automatically situating labels on a map, the map has features to be labeled, including a server operative to automatically situate labels on a map, which is carried out in a first subtask by identifying a set of candidate positions for labels of the features. The method is further carried out in a second subtask, by selecting initial candidate positions for each of the features. The method is further carried out in a third subtask by evaluating different candidate positions in comparison with the initial candidate positions to define a labeling, and responsively to the evaluation, replacing at least a portion of the initial candidate positions with corresponding different ones of the candidate positions so as to optimize a quality function of the labeling. The first subtask, the second subtask, and the third subtask each comprise a static phase and a real-time phase that is executed subsequent to the static phase, responsively to data produced in the static phase.

BRIEF DESCRIPTION OF THE DRAWINGS

For a better understanding of the present invention, reference is made to the detailed description of the invention, by way of example, which is to be read in conjunction with the following drawings, wherein like elements are given like reference numerals, and wherein:

FIG. 4 is a diagram illustrating the geometric significance of the metric line_over, which is utilized in accordance with a disclosed embodiment of the invention; and FIG. 5 is a diagram of map features and labels illustrating certain terminology relating to polyline metrics, which are employed in the methods shown in FIG. 2 and FIG. 3, in accordance with a disclosed embodiment of the invention.

DETAILED DESCRIPTION OF THE INVENTION

Figure 1:
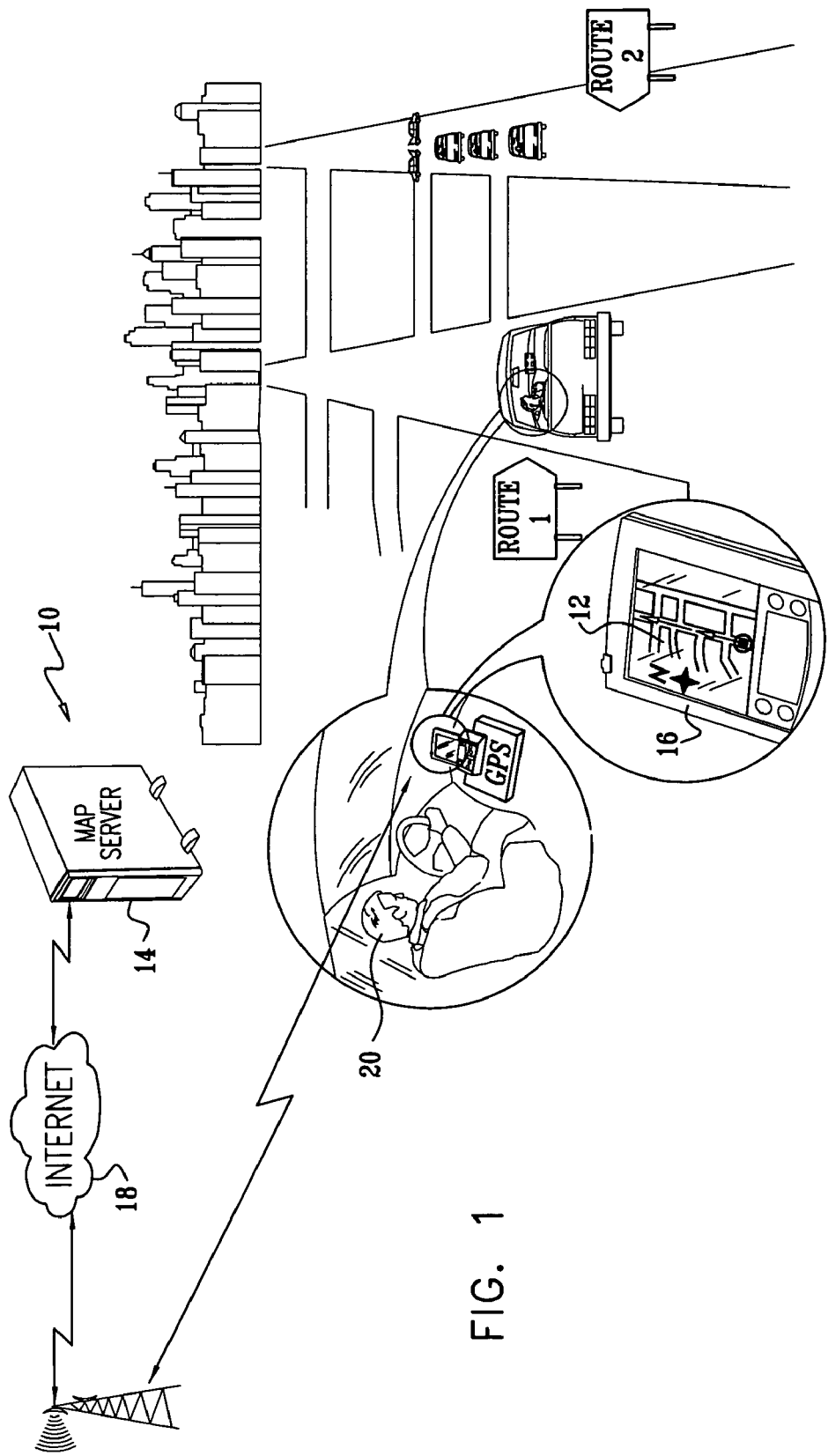
FIG. 1 schematically illustrates a system for performing map labeling that is constructed and operative in accordance with a disclosed embodiment of the invention.

In the following description, numerous specific details are set forth in order to provide a thorough understanding of the present invention. It will be apparent to one skilled in the art, however, that the present invention may be practiced without these specific details. In other instances well-known circuits, control logic, and the details of computer program instructions for conventional algorithms and processes have not been shown in detail in order not to obscure the present invention unnecessarily.

Software programming code, which embodies aspects of the present invention, is typically maintained in permanent storage, such as a computer readable medium. In a client-server environment, such software programming code may be stored on a client or a server. The software programming code may be embodied on any of a variety of known media for use with a data processing system. This includes, but is not limited to, magnetic and optical storage devices such as disk drives, magnetic tape, compact discs (CD's), digital video discs (DVD's). In addition, while the invention may be embodied in computer software, the functions necessary to implement the invention may alternatively be embodied in part or in whole using hardware components such as application-specific integrated circuits or other hardware, or some combination of hardware components and software.

Problem Statement.

A drawing of a graph or cartographic map is a visual representation of planar points, curves, and faces, where points are represented by symbols such as circles or boxes, and each curve is represented by a simple thick polygonal chain, a polyline. Let $\Gamma$ be a drawing of a map or a graph, and $F=\{f_i\}$ be a set of graphical features of $\Gamma$ to be labeled. Each graphical feature $f_i$ in the set F may have more than one label associated therewith. Let $L^i=\{l_j^i\}$ be the set of labels associated with a feature $f_i$. The solution to the GFLP problem consists of two phases: (1) position generation, and (2) position selection. During the first phase each label $l_j^i$ is assigned a set of position candidates $A^{ij}=\{a_k^{ij}\}$. The quality of different candidates of a given label may vary, but each of them is accepted as capable of presenting the relevant information adequately. During the second phase, a single position $a_{k(i,j)}^{ij} \in A^{ij}$ for each label $l_j^i$ is selected. A final placement of all labels of all graphical features of some problem instance, say $A=\cup^{ij} a_{k(i,j)}^{ij}$ is associated with a score or a cost c(A) that indicates its quality. The GFLP can be viewed as a non-linear optimization problem, where the objective is to find a label placement of minimum total cost under a plurality of constraints.

In other words, the practical solution of the GFLP involves a set of constraints and partial cost functions that linearly form a total cost function to be optimized. Taken together, these functions reflect tradeoffs among competing concerns involved in typical map labeling problems. These cost functions must take into consideration the following constraints:

Overlapping prevention: No label overlaps with other labels or other graphical features including grid lines. This is especially important for horizontal labels.

Proximity enforcement: A label must be in close proximity to the graphical feature it annotates. This applies to a point or a polyline.

Boundary enforcement: A label is forced to be within a specified area. This applies, for example, to an real graphical feature.

Centration: Labels are penalized if they are far from the center of a graphical feature, e.g., an real graphical feature, according to some distribution function. The distribution function is related to shape analysis, and is not necessarily homogeneous.

Spread: Replicated labels, or any two labels, are sufficiently far from each other.

Partial Order: A label associated with a graphical feature must be closer to the graphical feature than other labels. In the case of a point, this is trivial. However, in case of a line, this must be defined more accurately.

Priority: The omission of labels due to dense label placements or conflicts in general may be allowed.

Density Distribution: Names should neither be fully dispersed over the map, nor should they be densely clustered.

Font: Type arrangement should reflect the classification and hierarchy of objects on the map. Variation of font type, style, and size is generally allowed.

In addition to the above requirements, it is recommended to observe the following considerations as a matter of good labeling practice:

Punctiform Designations.

Horizontal labels should not be set on grid lines.

The best place for a point designation of a point label is to the right and slightly above the point symbol. If this is not possible, then the next best choice, given that free space is available only over or under the object, is over the object.

The optimum distance of a point label from its object depends on the map scale, and further, on the relative sizes of the object and the label font size.

The label of a point object that relates to a linear feature must lie entirely on the same side of the point object as the point object lies with respect to the linear feature. The label of a point object that extends to both sides of a linear feature must also span the linear feature.

Labels of shore and coastal places should be written completely on the water surface. Labels of places not lying on the shore should be written completely on the land surface.

The orientation of labels of coastal places should be arranged so as to point outwards from the coast.

An alternate name, if present, is preferably printed in a lighter font type than a primary name, and must either be symmetrically placed beneath the primary name, or be enclosed in brackets closely following the primary name.

A mountain summit is considered as a punctiform designation. Mountain passes are variably treated according to the rules of punctiform or linear designations, depending on scale and importance. Sometimes it is necessary to break the label into multiple lines.

Linear Designations.

A label should be placed along the line to which it refers, and preferably over the line rather than under it.

The orientation of labels should conform to the curvature of the line, however complicated. Nevertheless, extreme curvatures should be avoided.

Horizontal or nearly horizontal orientations are preferred.

The label should be slightly spaced apart from the line that it annotates.

The label should be repeated at suitable intervals along the line. The label should be placed where the line bends least, does not run vertically up and down, and where there are fewest objects.

Labels of vertical lines should be oriented upward.

Real Designations.

Labels should be bent, and spread so that they stretch as much as possible across the horizontal axis of the area.

Labels should be expanded towards the boundaries of the area, leaving a margin at least 1.5 times the size of the letters on either end of the label.

Long labels can be divided into multiple horizontal lines using hyphens.

Non-horizontal labels should be slightly curved along a circular arc no greater than 60 degrees.

Objects such as large rivers are by definition real features, as the designation is placed inside the area. However, these objects also fall under certain rules for linear designations. The labels of these features should not be spaced out or spread. Rather, they should be repeated at suitable intervals.

Labels should be upright as possible, and clockwise oriented for left-to-right languages. On the left half of the map, the writing direction should be from bottom to top, while on the right half of the map the writing direction should be from top to bottom.

In ambiguous cases, labels of adjacent areas should have the same direction.

Letters should be spaced apart not more than twice the type height, depending also on the map contents and density, and must be equidistant from one another.

Labels should overlap as little as possible. If they must cross, right angles are to be avoided.

Figures formed through visual connection of two or more different labels should be avoided as much as possible.

Labels should overlap other features as little as possible.

Labels should interrupt line objects when they pass across them.

Special Issues.

On small scale maps, labels should be parallel to the lines of latitude, and should not be set on grid lines.

System Overview.

Turning now to the drawings, reference is initially made to FIG. 1, which schematically illustrates a system 10 that is constructed and operative in accordance with a disclosed embodiment of the invention. The above-noted map labeling problem is solved in a client-server environment. Data enabling the display of a map 12, at least partly constructed and formatted by a map server 14, is transmitted from the server 14 to a client 16 over a suitable data network 18, which can be the Internet.

The client 16 is typically connected to the network 18 by a wireless link and is operated by a mobile user 20. The map 12 is presented on a display screen of the client 16 according to some criteria set up at the client 16. Some of the data may be preprocessed and saved on the server 14; however, most data is processed in real time on the server 14. The client 16 runs a process that does little more than display the map on the display screen. While the client 16 can be realized as one of many different devices, such as personal computers or workstations, typically it is a thin client, having limited resources, such as a mobile telephone, PDA, or a specialized navigation device. While one client is shown representatively in FIG. 1, the server 14 is capable of processing concurrent requests from many clients, both mobile and stationary, which may have different capabilities.

In this configuration, the client 16 typically issues a request to the server 14. In response, the server 14 processes data relevant to the request. This data consists of combinations of raw cartographic data, pre-established configure parameters set up by the user 20, and sometimes preprocessed data that was stored during previous sessions. Processing by the server 14 results in geometric data appropriate for display of the map on the screen of the client 16, and may include additional information, as may be required for local navigation. The server 14 transmits processing results to the client 16.

The server 14 is often required to process many requests from the same or different clients within a short period of time, and serve each essentially in real time. Label placement is one of the functions that are performed by the server 14 responsively to a client request. For example, a label attribute may change responsively to a change in a display requirement at the client 16, for example, zoom level, window resizing, or a search for a specific graphic feature. As further examples, the font type or size in one or more labels may change, or the display of an optional label may become mandatory, overriding a template pattern at a given zoom level.

In other cases, it may be necessary to perform map rotation as a response to an action of the user 20, such as varying his direction, or varying the orientation of the client 16. In such a case, the best way to display the map 12 is to rotate it, such that map is aligned with a current direction of navigational advance. It is often the case that some labels must be rotated together with the graphic features, while other labels must remain horizontal or be constrained to another orientation.

Figure 2:
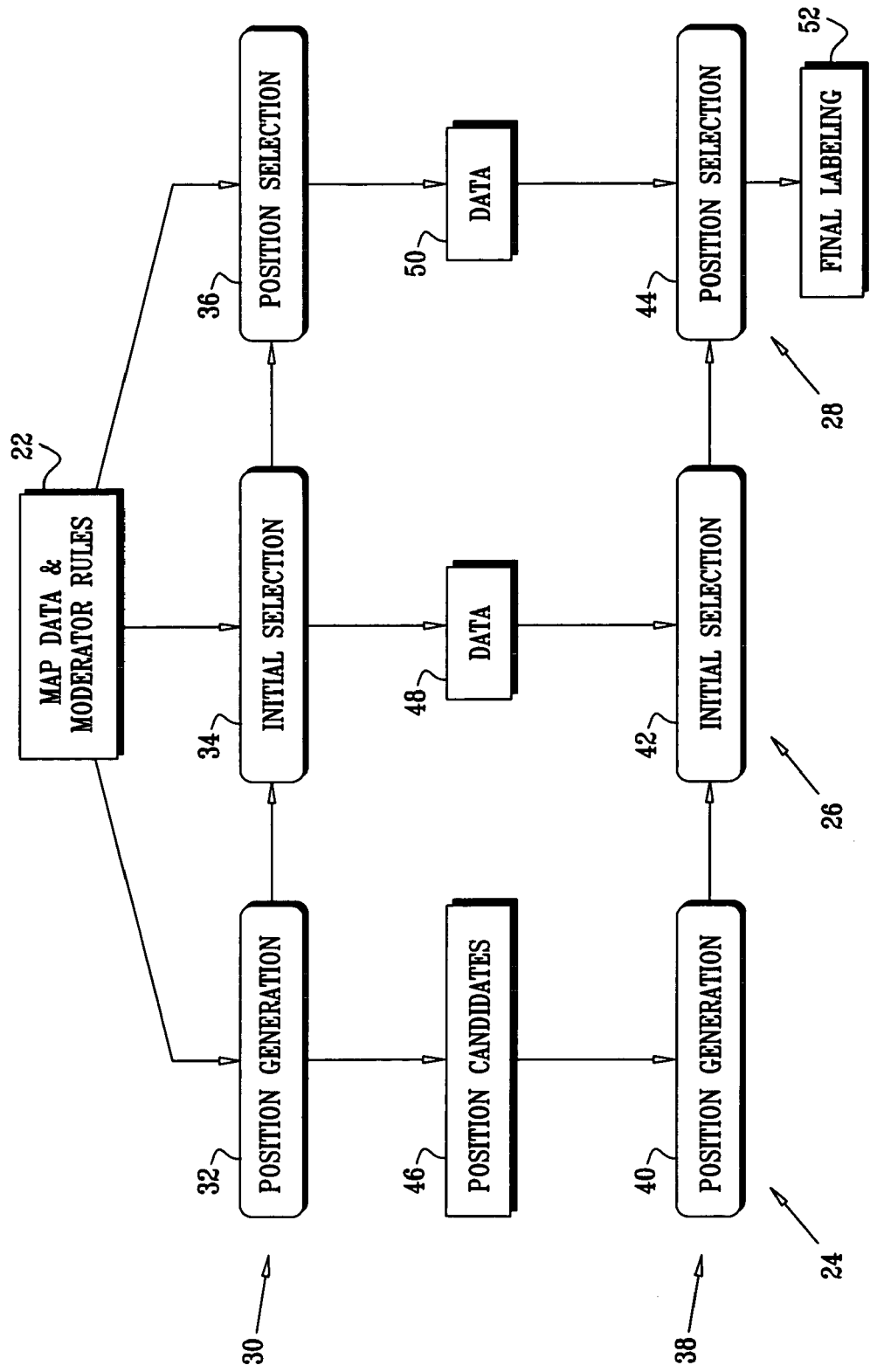
FIG. 2 is a high level flow chart illustrating a method of map labeling in accordance with a disclosed embodiment of the invention.

Reference is now made to FIG. 2, which is a high level flow chart illustrating a method of map labeling in accordance with a disclosed embodiment of the invention. At initial step 22, a choice of rules is made by an operator, also referred to herein as a moderator. The rules are bound to a map to be labeled. The moderator is permitted to change existing rules and introduce new ones, which are saved in a rule database. Thus, the rules that are applicable to a given map are flexible. More particularly, the moderator is allowed to select the algorithms used to accomplish various tasks, the scope of preprocessing, and is permitted to set parameters for selected algorithms. Examples of such parameters include the number of candidate positions per label, display parameters, and maximum zoom levels.

The label placement task is broken into three subtasks 24, 26, 28, which are generally performed independently but can sometimes interchange data at different stages. Each subtask has its own pipeline. System throughput can thus be maximized as a result of parallel or multi-threaded processing by the server 14 (FIG. 2), wherein each of the subtasks has its own series of processes or threads, which can exchange data with one another.

The subtasks 24, 26, 28 include a static phase 30, consisting of preprocessing stages 32, 34, 36, which are executed offline, and an online real-time phase 38, consisting of processing stages 40, 42, 44. The subtasks 24, 26, 28 are executed in a pipeline fashion. Each process that corresponds to a subtask consumes data produced by the previous process in the pipe. Thus, the processing stages 40, 42, 44 consume data 46, 48, 50, generated respectively during the corresponding preprocessing stages 32, 34, 36 in order to expedite the entire procedure.

Different map and labeling characteristics govern the division of each subtask into the preprocessing and real-time processing phases. For example, if a label bounding rectangle and orientation of some graphic features are known in advance, a set of candidate positions for these graphic features can be computed during the static phase 30. On the other hand, if a label of a graphic feature must be kept horizontal, and the user is allowed to rotate the map, the candidate positions for this feature must be adjusted each rotation during the real-time phase 38.

The subtask 24 is candidate position generation. Given a point, line, or area feature as input, the object is to identify a set of candidate positions for its label. The subtask 24 produces a set of candidate label positions. The following general rules apply to the subtask 24 in the current embodiment, based on practical considerations of the computation of metrics and the evaluation of cost functions. However, in other embodiments some of these rules may be relaxed, depending on hardware performance.

The number of generated positions should be relatively small. An upper bound of 32 candidate positions is currently applied to each graphical feature.

As a matter of strategy, tradeoffs attempt to strike an appropriate balance between efficiency and quality. Identifying only high quality label positions could be too expensive and difficult, whereas naive methods tend to produce too many low-quality candidates.

The candidate positions for a given label should occupy a variety of different locations near its feature, in order to facilitate tradeoffs between label positions of different features, while seeking a globally optimal labeling.

Initial position selection is performed in the subtask 26. A set of candidate label positions is assembled for each map feature. This set may be derived in many combinations from the set generated by the subtask 24, and from positions initially selected in the preprocessing stage 34. Given a set of candidate label positions for each map feature, an initial labeling is then computed as the output of the subtask 26. It consists of a single label position for each set.

Final position selection is performed in the subtask 28. Given a set of candidate label positions for each map feature, and an initial labeling, the overall quality of the labeling is improved, as determined by an evaluation function, by repeatedly replacing the chosen position for each map feature, until some termination conditions are met. The initial labeling may be derived in various combinations from the initial labeling constructed in the subtask 36, and from position selection in the processing stage 44. In a final labeling 52, one label position is drawn from each feature's set of candidate positions.

Simulated Annealing.

Final position selection in the processing stage 44 is accomplished by simulated annealing, and in some embodiments, using a variant of simulated annealing referred as simulated quenching. Simulated annealing is well known in the art, for example from the document S. Kirkpatrick, C. D. Gelatt, and M. P. Vecchi. *Optimization by Simulated Annealing*. Science, Number 4598, 13 May 1983, 220, 4598:671-680, 1983. Its efficiency and quality are controlled by many parameters. The processing stage 44 constitutes a learning system, in which these parameters are iteratively updated, based on previous iterations.

Briefly, simulated annealing is an iterative and stochastic technique modeled on the physical annealing process. It consists of successive update steps, where the update step length is proportional to an arbitrarily set parameter, playing the role of temperature in the physical world. As such, the technique is suitable for simulating learning processes, and in the context of map labeling, solving minimization problems, where a continuous gradient function to guide the minimization does not exist, or where standard gradient following algorithms are likely to become trapped at a local minimum. By analogy with the annealing of materials, the temperature is set high in the early stages of the process for faster learning or minimization. Then it is reduced for greater stability.

Simulated annealing is capable of processing cost functions possessing significant degrees of nonlinearities, discontinuities, and stochasticity. It can also process arbitrary boundary conditions and constraints imposed on cost functions. It can find an optimal solution, but at the expense of time consumption. Its apparent ease of implementation is deceptive, however. Fine-tuning the algorithm to solve specific problems within practical time limits is a serious technical difficulty, which has been solved for the map labeling problem according to the present invention.

Figure 3:
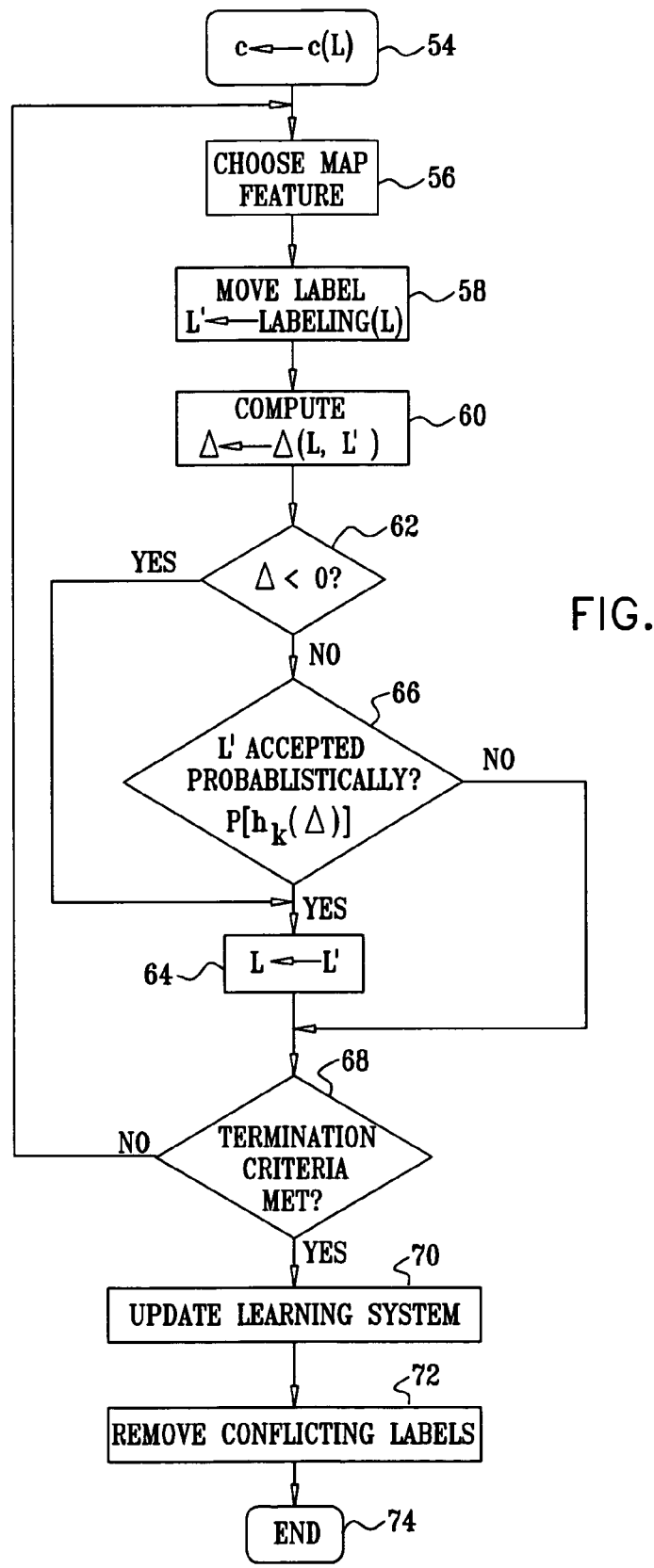
FIG. 3 is a flow chart illustrating a method applying simulated annealing to an initial map labeling, in accordance with a disclosed embodiment of the invention.

Reference is now made to FIG. 3, which is a flow chart illustrating the application of simulated annealing to an initial map labeling, in accordance with a disclosed embodiment of the invention. At initial step 54 an initial labeling L is provided, as generally disclosed hereinabove. A cost function c(L) is evaluated with respect to the labeling L, c←c(L).

Next, at step 56 a map feature in the labeling L is chosen randomly.

Next, at step 58, the label of the feature that was chosen in step 56 is moved to a new position that is randomly selected from that feature's set of candidate positions. A new labeling is computed, L'←labeling (L).

Next, at step 60, a difference Δ in the labeling cost function c caused by repositioning the label in step 58 is computed, Δ←Δ(L, L').

Control now proceeds to decision step 62, where it is determined if the new labeling L' is superior to the labeling L. This is the case if Δ<0.

If the determination at decision step 62 is affirmative, then control proceeds to step 64. The new labeling L' is accepted for use in subsequent iterations, L←L'.

If the determination at decision step 62 is negative, then control proceeds to decision step 66. The new labeling L' may still be accepted probabilistically, with probability $h_k(\Delta)$, wherein $$h_k(\Delta) = \frac{1}{1 + \exp(-\Delta/T_k)} \approx \exp(-\Delta/T_k) \tag{1}$$

T is a parameter analogous to temperature, and k is an annealing time step. A suitable annealing schedule is $$T_k = T_0 \frac{\ln k_0}{\ln k} \tag{2}$$

A variant of simulated annealing, known as simulated quenching, is used in the current embodiment for simplicity and efficiency. Simulated quenching trades ergodicity, that is, the probability that any state will recur, for expediency by utilizing a relatively fast cooling schedule. The initial values of the temperature T, its reduction rate, reduction amount, and termination criteria for finding near-optimal solutions to the label-placement problem effectively are application dependent. However, it is suitable to set an initial probability $h_0=\frac{1}{3}$ for the first n=50 passes for acceptance of non-improving changes. An average value $\overline{\Delta}$ of the non-improving Δ values among the first n passes is computed, and Equation (2) solved for k=0:

$$T = \frac{\overline{\Delta}}{\ln 1/h_0}. \quad (3)$$

From then on, T is reduced periodically according to the following schedule:

$$T \leftarrow \lambda T, 0 < \lambda < 1 \quad (4).$$

where $\lambda$ is set to 0.9. The period (number of random perturbations with constant T) is proportional to the number of maximal candidate positions per label. The period is set to 10 in the current embodiment.

At decision step 66 it is determined whether the new labeling L' is to be accepted according to the probability $h_k(\Delta)$.

If the determination at decision step 66 is negative, then control proceeds to decision step 68, which is described below.

If the determination at decision step 66 is affirmative, then control proceeds to step 64. The new labeling L' is accepted for use as the labeling L in subsequent iterations.

Control now proceeds to decision step 68, where it is determined if any of the following termination criterion have been met: (1) The number of temperature reductions exceeds $c_1=100$. This is a fail-safe condition, which is applied when all others fail. (2) The number of consecutive temperature reductions with no changes made exceeds $c_2=4$. (3) The number of consecutive label repositionings (step 58) with no changes made in the labeling L exceeds a number that is proportional to the number of graphic features. A proportionality constant $c_3$ is set to $c_3=4$ in the current embodiment. For example, if there are 12 graphic features, this termination criterion is met if step 58 has been performed three times (12/4=3) with no change in the labeling L.

If the determination at decision step 68 is negative, then control returns to step 56 to begin a new iteration.

If the determination at decision step 68 is affirmative, then control proceeds to step 70. As noted above, the parameters used in simulated annealing during the performance of decision step 66 have initial settings, which are now stored in a learning system. Each map to be labeled includes a database that has its own initial settings. These initial settings may vary from database to database, depending on various characteristics, such as the density of the labels in the database, or the purpose of the map. Some maps are intended to be used in navigation systems, in which case it is better not to condense labels excessively. Other maps are intended to display points of interest. In these cases, the final display should include as many labels as possible, so long as they are pairwise disjoint in their interiors. Each time an iteration of simulated annealing ends, the cost of the final labeling is sent back to update the learning system for future exploitation. When the learning system is asked for a set of parameter values, it picks the values that produced the lowest cost in past sessions and then applies a small and random perturbation on some of the values before it sends the values to the simulated annealing process. A database might be associated with more than one instance of the learning system, if it is used for more than one purpose.

Control now proceeds to an optional step 72. Simulated annealing is a stochastic technique. As such, it does not guarantee optimal results. However, it usually produces practical near-optimal results. In some cases even near-optimal label placement includes two or more overlapping labels. In cases where the final label placement, whether produced by simulated annealing or any other technique, has conflicting labels, one or more conflicting labels are removed in order to improve clarity. In some embodiments, this may be done in accordance with parameters, such as the relative priority of each conflicting label. When two labels are in conflict, the label with the lower priority is removed. When a label removal method is integrated with the simulated annealing technique disclosed above by including step 72, the quality of the final result increases.

Control now proceeds to final step 74, and the procedure terminates.

Of course, application of the label placement method disclosed above with reference to FIG. 3 requires the ability to compute a single numeric score c(L) given a labeling L. Its overall efficiency depends crucially on efficient computation of the numeric difference between two successive labelings, $\Delta(L, L')=c(L')-c(L)$.

Virtual Candidate Position.

Referring again to FIG. 2, when generating candidate label positions in subtask 24, a finite set of candidate positions are computed for each label. In addition, an additional candidate label position is inserted in each set, which is called the virtual candidate position. A label associated with the virtual candidate position in the final placement is removed. The metric parameters of the virtual candidate position are carefully designed so as to yield a high cost when the virtual position is selected during subtask 24, yet lower than the cost of a conflict in which the label might become involved. Details of various metrics used in the computation are disclosed hereinbelow.

The virtual candidate position has a zero size bounding rectangle. When the virtual candidate position of a label is selected in the placement process, the label is not displayed and effectively eliminated. It may be noted that the simulated annealing process does not distinguish between the virtual candidate and the other candidate for any graphic feature. Its cost is computed by the chosen metrics. Even with the use of the virtual candidate technique, however, conflicts may remain at the end of the annealing process. Therefore, it is recommended that step 72, the optional candidate removal step described above, be performed.

The static cost of the virtual candidate position v of a label 1 is given by the following formula:

$$c(v)=b+\text{priority }(1)*s \quad (5),$$

where b and s are respectively a bias and scale chosen by the moderator, the operator "*" represents multiplication, and priority is an attribute of label types that is set by the moderator, but may also be sensitive to client actions. For example, if a client looks for a particular graphic feature, e.g., a city, lake, street, then the priority of the graphic feature's label grows.

General Metrics.

The following general metrics are used in the development of the cost function c(L) and quantify spatial crowding.

Point_over—measures the negative effect of overlapping between the label and a point symbol p. This metric simply counts the number of such overlaps.

Point_over=intersect (p)

where intersect(p) is 1 if the label intersects the point symbol p, and 0 otherwise.

Line_over—measures the effect of overlapping between a label and a line symbol. This metric takes in account the intersection angle, as a label position that intersects the polyline of a line feature at a right angle is preferred over one that is parallel to the polyline.

Reference is now made to FIG. 4, which is a diagram illustrating the geometric significance of the metric line_over, which is utilized in accordance with a disclosed embodiment of the invention. Let $p_1$ and $p_2$ be the points where a polyline stabs a label bounding rectangle 76. Let the normalized vector $\hat{b}$ point in the direction of the label's baseline, and the vector $$\hat{v} = \frac{p_2 - p_1}{|p_2 - p_1|} \text{ then}$$

$$\text{Line\_over} = \text{intersect}(l)(1 + c|\hat{v} \cdot \hat{b}|),$$

where intersect (1) is 1, if the label intersects the line symbol 1, and 0 otherwise. The metric line_over evaluates to a numeric value taken from the range [0.0; c], where c is a constant. The value 9 is suitable for the constant c.

The formula given above for the metric line_over is based solely on the label and line symbol directions. A higher quality, but more time consuming alternative is to consider the area of intersection, using a metric area_over, the definition of which follows.

Area_over—measures the effect of overlapping between a label and an area symbol.

$$\text{Area\_over} = \text{intersection}(a),$$

where intersection(a) is the normalized area of intersection between a label and an area symbol a.

Label_over—the number of overlaps between a candidate label position and the candidate positions of all other labels currently selected. This metric is the only one that cannot be precomputed for the candidate label positions, and instead must be recomputed continually during the labeling position selection. In order to expedite the reevaluation of this metric, all pairs of intersections between candidate label positions are precomputed once they are generated.

Potentially Overlapping Lists.

It will be recalled that efficient computation of the numeric difference between the cost of two successive labelings, $\Delta(L, L')=c(L')-c(L)$, is crucial to the practical application of simulated annealing to map labeling.

In performing this computation a distinction is made between metrics that govern the positioning of labels with respect to the features they tag, and metrics that quantify spatial crowding and overlap, and that apply to each graphical feature equally regardless of its type (i.e., point, line, area). Each label contributes the number of overlaps between its position and all others to the metric Label_over (L). Indeed, the computational effort in computing the Label_over (L) metric of two successive labelings dominates the time required for the computation of the numeric difference between the cost of two successive labelings, $\Delta(L', L)$.

In the current embodiment, data for each candidate position of each label is precomputed once the candidate position has been generated. This data is used to expedite the reevaluation of the metric Label_over (L) during label position generation. To this end, two strategies have been implemented that produce different, but related types of precomputed data. Only one strategy is applied during each label placement session. The selection of the appropriate strategy is governed by rules introduced by the moderator.

If a session involves many labels, especially labels that tag line features, a sophisticated strategy is typically selected. This strategy is based on a sweep line algorithm introduced in the document J. L. Bentley and T. A. Ottmann. *Algorithms for reporting and counting geometric intersections*, IEEE Trans. Comput., C-28(9):643-647, September 1979. A vertical line, called a sweep line, is swept over a plane from left to right. The algorithm as proposed by Bentley and Ottmann was designed to handle segments. A variant is used in the invention, which handles bounding boxes of label candidate-positions.

The running time of this algorithm for a set of n input bounded boxes that intersect in k points is O((n+k) log n). The output of the algorithm consists of overlapping candidate positions. Each candidate position A of each label is associated with a linked list of all the candidate positions of other labels that overlap the candidate position A.

The overhead of the sweep line algorithm is quite significant, and for sessions with a small number of labels an alternative strategy is preferred. The alternative strategy has—a worse asymptotic time complexity and produces conservative results, but involves relatively little overhead. Consequently, the time required to execute the label position placement process for cases having a small number of labels is reduced. For each label 1, the "super bounding box" (bounding rectangle) s(1) of all candidate positions is computed. A super bounding box s(1) is the smallest box that encloses all the elementary boxes that enclose individual candidate label positions of a particular label 1. Then, for each label 1 all other labels are traversed. If the super bounding-box s(1') of another label 1' overlaps the super bounding box s(1), the label 1' is inserted into the linked list of potentially overlapping-labels associated with the label 1, and the label 1 is inserted into the linked list of potentially overlapping-labels associated with the label 1'. This method often turns out to be superior, although it produces conservative results. For example, consider a label 1 of a line that has a large degree of curvature. The super bounding box s(1) of the label 1 could be very large, and thus could overlap many other candidate positions, which in fact do not overlap any candidate position of the label 1.

Consider a label 1 chosen at some iteration of the annealing process, and assume that the position A is the candidate position currently selected for the label 1, and the position A' is the newly selected candidate position. It is necessary to compute Label_over(L')−Label_over(L), where L is the current labeling and L' is a new labeling when the iteration completes. If the sweep-line based strategy is in effect, then all that need be done is traverse the linked lists of overlapping candidate-positions of the positions A and A'. Recall that exactly one candidate position of every label is currently selected. During each of the two traversals, the number of candidates that are currently selected for their respective labels is counted, and the difference between the counts is returned. If, on the other hand, the simple strategy is in effect, more computation is necessary. Since the lists are conservative, they are large, and all the candidate positions in the lists may not actually intersect their respective associated positions A and A'. In this case, it is necessary to traverse the linked lists of potentially overlapping-labels. For each label in the lists of the positions A and A', it is necessary to compute whether its selected candidate position really intersects the positions A, A' respectively.

Area Label Metrics.

Metrics relating to real features quantify the relationship between a label position and the area feature that it annotates. A single metric is generally sufficient for satisfactory area-feature labeling. However, in the case of areas having certain shapes, additional metrics that are sensitive to the shape of the area are recommended to be incorporated.

Centroidness—measures the proximity of a label to the centroid of the area it references. Let c be the distance from the center of the label position to the centroid of its area feature, and let s be the distance from the area's centroid to its farthest vertex. A suitable linear function is:

$$\text{Centroidness} = \frac{c}{s}$$

Real Label Candidate Positions.

Given a polygon P that describes a graphical real feature, and the dimensions and orientation of the bounding rectangle of an associated label, a large number of candidate positions are generated, and then culled by static (precomputable) metrics, similar to the line position generation procedure, which is described below. Real feature metrics quantify the relationship between a label position and the real feature tagged by the label.

The generation of the set of potential candidate positions consists of two computations. During the first computation, a "skeleton" S of the polygon P is computed. The skeleton of a polygon is a tree-like structure in which leaves of the tree are the vertices of the polygon. Thus, the skeleton appears to "support" the polygon. In a second computation, candidate positions are generated and evaluated. The static cost of each candidate position depends on the distance of its bounding-rectangle center from the skeleton, and on the distance of the skeleton at the nearest point to the bounding rectangle from the boundary of the polygon cropped along the window frame.

In some embodiments, the first computation is performed during the static phase 30 (FIG. 2)). Thus, when the second computation begins, the polygon P is already cropped. An inset polygon p' is computed, such that if the label is centered at any point in the inset polygon p', the label will lie entirely inside the polygon P. If the inset polygon p' is empty, then it is impossible to place the label entirely inside the polygon P. In this case the area is labeled as if it were a point feature. When the inset polygon p' is not empty, its skeleton is computed and passed to the second computation.

Sometimes it is not desirable to perform the first computation during the static phase 30, for example due to memory limitations in the processor. In this event, both computations are performed during the real-time phase 38 (FIG. 2).

In embodiments in which the first computation is performed during the static phase 30, the procedure continues as follows. If the label's bounding rectangle and orientation are unknown in advance, then a relatively large set of potential candidate positions is generated and stored. Then, during the real-time phase 38 (FIG. 2), candidate positions that do not lie entirely inside the polygon P are culled out.

If the attributes of the label, i.e., bounding-rectangle size and orientation, are known in advance, then only intermediate results that represent the skeleton of the polygon P (and not the inset polygon p') are computed and stored. Then, during the real-time phase 38, the skeleton is retrieved and cropped along the window frame, and the final candidates are verified to lie entirely inside the polygon P cropped along the window frame.

Two strategies for computing the skeleton have been implemented. The selection of the appropriate strategy is governed by rules introduced by the moderator, and is based on the complexity of the polygons, and on time and space constraints of the computing device. If the generation of the entire set of potential candidate positions can be completed during the static phase 30 (FIG. 2), or if the boundary of the polygon P (or the inset polygon p') consists of a relatively few segments, then a sophisticated strategy based on the computation of the medial axes of the polygon is selected. Otherwise, a simple strategy based on the decomposition of the polygon into convex polygons is selected. In the latter case, the result is a sparse skeleton.

A definition is useful to facilitate understanding of the computation of the medial axes: The Voronoi diagram of a point set Q decomposes the plane into regions around each point such that each point within a region is closer to some site in the set Q than to any other site in the set Q. Similarly, the Voronoi diagram of a set of line segments L decomposes the plane into regions around each line segment such that each point within a region is closer to a particular site in the set L than to any other site in the set L.

The polygon P is defined by a collection of line segments, such that each consecutive pair of line segments shares a vertex. The medial axis transform of a polygon is simply the portion of the line-segment Voronoi diagram that lies within the polygon. In the current embodiment, medial axes are computed using an algorithm described in the document S. Fortune. *A Sweep-line Algorithm for Voronoi Diagrams*. Algorithmica, 2:153-174, 1987. This implementation allows for incremental construction of the medial axes during the dynamic stage, as the need to crop the polygon along the window frame may arise.

The medial axis transformation of a polygon without holes is always a tree, making it fairly easy to manipulate and measure distances. For example, this can be done using the "edit distance" between the skeleton of a known model and the skeleton of an unknown object. Whenever the two skeletons are close enough, an unknown object can be classified as an instance of the known model. To this end, the distance between the skeleton and a portion of the bounding rectangle of a candidate position must be computed. The skeleton of a polygon with holes is not a tree, but an embedded planar graph, which is easy to work with.

The simple strategy is used either when time dictates faster results than can be provided by medial axes computation, or when the medial axes are likely to be too complex. A large amount of memory is required to accommodate the representation of complex medial axes. Furthermore, cropping along a window frame may consume an unacceptable large amount of time during the dynamic stage. Thus, to implement the simple strategy, the polygon is decomposed into a plurality of "simple" polygons, and the medial axes of each are computed. The final result is the union of all the medial axes. In an extreme case, the polygon is decomposed into triangles, and the final result is the finite set of the triangle centers. While results may be quickly obtained using the simple strategy, the quality of these results is not generally as good as with the more sophisticated medial axis computation.

Potential Candidate Position Generation.

Two strategies are used to compute the set of potential real label candidate positions. The selection of the appropriate strategy is governed by rules introduced by the moderator, and is mainly based on the type of intermediate results produced in the static phase 30 (FIG. 2). The first strategy is based on a random approach. We generate n quasirandom points evenly distributed throughout a polygon P', using the well-known Sobol quasirandom sequence, and generate label positions centered at these points. The skeleton is traversed only to evaluate the cost of each candidate. The second strategy is an exhaustive search.

Polyline Metrics—Terminology.

Reference is now made to FIG. 5, which is a diaegy of map features and labels illustrating certain terminology relating to polyline metrics, which are employed in accordance with a disclosed embodiment of the invention. A map label 78 in the top figure is positioned above the line that it annotates, while a map label 80 in the bottom figure is positioned on the line.

A baseline 82 is a line upon which characters of the map label 78 are drawn.

A skyline 84 is the union of the bounding boxes of the characters of a map label. The skyline may extend above and below the baseline.

A midline 86 is a line parallel to the baseline and passes thought the middle of the extreme points of the skyline.

A swath 88 is a strip perpendicular to the baseline and centered about the label. The width of the swath is 1.2 times the width of the label.

A swath line 90 is a part of a polyline 92 near the map label 78 that intersects the swath 88.

Polyline Metrics—Definitions.

Ideal distance—the desired distance between the baseline and the swath line when the label is positioned above the line. Ideally, the swath line is straight, and its distance from the baseline remains the ideal distance along the swath.

Ascent—the distance from the baseline to the top of capital letters of the label type.

Average distance—If the label is positioned above a feature, then the average distance d is the area in the swath bounded by the swath line from below and by the lower envelope of the skyline from above divided by the swath width. Similarly, if the label is positioned below a feature, then the average distance d is the area in the swath bounded by the swath line from above and by the upper envelope of the skyline from below divided by the swath width. If the label is positioned on the feature, then the average distance d is the area in the swath bounded by the swath line and the midline divided by the swath width. This metric yields an optimal measure of 0.0 for an average distance equal to the ideal distance as defined above.

$$\delta = \text{ascent}/4 + \text{thickness}/2$$

$$\text{Ave\_dist}_{on} = \left(\frac{d}{\delta}\right)^r$$

$$\text{Ave\_dist}_{above} = \left(\frac{d-\delta}{\delta}\right)^r$$

where δ is the ideal distance, and r is chosen to be 2.

Minimum Distance—the minimum distance between any two points on the swath line and on the skyline or midline depending on whether the label is positioned above, below, or on the polyline.

Maximum distance—the maximum distance between any two points on the swath line and on the skyline or midline depending on whether the label is positioned above, below, or on the polyline.

Curvature of a line or descenders in the label might result in a label that is in very close proximity with its line feature, or even on it, while the average distance is kept large. This potential anomaly is quantified using the simple minimum and maximum distance. The formula for minimum distance is $$\text{Min\_dist} = \left(\frac{d' - \delta}{\delta}\right)^r,$$

and the formula for the maximum distance is similar, as explained above.

Aboveness—This metric can be understood from a consideration of a horizontal line feature and a label running from left to right: the label may be placed above or below the line. The metric aboveness has a value of 0.0 if the position is above the line, 1.0 if it is below the line.

Centeredness—each polyline is divided into sections, such that each section accommodates a single occurrence of the label associated with the line feature. Thus, a label is repeated along the line. The number of sections and the size of each section are controlled by the moderator. The global metric centeredness is used to evaluate the proximity of a label and the center of its associated polyline section. Let p be a point on a polyline closest to the midpoint of the label baseline. Let $l_1$ be the distance along the polyline from one end of the section to p, and let l be the section's total length. The ideal case is clearly when the point p lies in the center, that is $l_1 = 1$.

A boundary case occurs when p lies at an end of a section. That is, $l_1 = 0$ or $l_1 = 1$. The metric centeredness is calculated as:

$$\text{Centeredness} = \left|\frac{2l_1 - l}{l}\right|.$$

The procedure shown in Listing 1 can be used to compute candidate positions and orientations of a label for a given line section, $S = \{s(t) | t = [0; 1]\}$ and its label L. It produces a list of pairs of a translation and an orientation. The translation reference point is language dependent. For left-to-right languages, e.g., English, it is the left corner of the label baseline.

Listing 1

$t \leftarrow 0$ $l \leftarrow \dfrac{\text{width}(L)}{\text{length}(S)}$ $inc \leftarrow \dfrac{1}{8}l$ repeat Output pair$\left(s(t), \dfrac{\partial s(t)}{\partial t}\right)$ $t \leftarrow t + l$ until $t + l \geq 1$ Pinned Labels.

Labels may be partially or totally pinned. Each label is either directly associated with a set of attributes or indirectly associated through its membership in a label-template set. The number of candidate positions to be generated for a given label is an example of such an attribute. The candidate positions themselves are attributes. In this context, each candidate position can be fully described by its bounding box and orientation or partially described by its center point only. An icon that represents a point-of-interest on the map can serve as a label. In this case, a single fully described candidate position is provided. The simulated annealing process respects this label when attempting to place all other labels.

Viewport Issues.

The viewport of the map is a portion of a map that is displayed on the client window and is therefore visible by the client.

It is assumed that the map viewport is a rectangle, and in most cases an iso-rectangle, that is, a rectangle with sides parallel to the major axes of the map coordinate system.

Referring again to FIG. 1, the user 20 can apply commands that change the map viewport and the resolution within the map viewport. The viewport can be shifted as a response to a user command, and in some applications, it can be rotated. When a viewport is established, the graphical features that lie inside the viewport must be recognized and shifted to align with the display screen of the client 16. Shifting is handled globally by adjusting the projection of the map viewport into the client window. Culling the graphical features that do not map into the map viewport and their corresponding candidate positions is a straightforward application of spatial range searching.

If the viewport is not an iso-rectangle, the iso-rectangle bounding box is computed. All graphical features that lie inside the bounding box are identified, and then, by iterating over the potential features sequentially, those graphical features that do not lie inside the viewport are culled. This reduces the problem to a simpler problem referred to as orthogonal spatial range searching.

The structures "range tree" and "Kd-tree" are two well-known data structures suitable for orthogonal range searching. While the range tree is theoretically superior to the Kd-tree, the latter often seems to perform better. Each of these trees is derived from a set of points. During the static phase 30 (FIG. 2), the tree is constructed. During the real-time phase 38, all points that lie inside the query box representing the map viewport are extracted. The Kd-tree data structure, specifically a K2-tree variant, is preferred, as it is easier to implement, and handles line and polygon features as well.

Map rotation requires special treatment. Consider a map that is rotated as a response to a user command. Labels are divided into two subsets. The first subset consists of labels that are oriented according to the orientation and position of the graphical features they annotate. The second subset consists of labels that must be oriented in a predetermined orientation, typically a horizontal orientation. The candidate positions of all labels are rotated along with the rest of the map features in real time. Then, each candidate position of each label that is required to be confined to a predetermined orientation is rotated about its associated graphical feature in the opposite direction, so as to maintain its orientation.

It will be appreciated by persons skilled in the art that the present invention is not limited to what has been particularly shown and described hereinabove. Rather, the scope of the present invention includes both combinations and subcombinations of the various features described hereinabove, as well as variations and modifications thereof that are not in the prior art, which would occur to persons skilled in the art upon reading the foregoing description.

The invention claimed is:

1. A method of automatically annotating features on a map, having a first subtask, a second subtask and a third subtask, each having a static phase and a real-time phase, the method comprising the steps of:

in said first subtask, identifying a set of candidate positions for labels of said features, said static phase of said first subtask being performed prior to receiving a request for a map to be displayed, said static phase of said first subtask further comprising:

selecting rules for assignment of label attributes from a rule database;

responsively to said step of selecting rules, assigning said label attributes to said candidate positions, said label attributes comprising a font size, and a rotational orientation; and designating a virtual candidate position having a zero size bounding rectangle and having metric parameters such that a cost of a selection of said virtual candidate position in said third subtask is less than a cost of an overlap conflict between said virtual candidate position and others of said candidate positions;

in said second subtask, for each of said features selecting initial ones of said candidate positions;

in said third subtask, evaluating different ones of said candidate positions and said virtual candidate position in comparison with said initial ones of said candidate positions to define a labeling;

responsively to said step of evaluating, replacing at least a portion of said initial ones of said candidate positions with corresponding said different ones of said candidate positions so as to optimize a quality function of said labeling, wherein said real-time phase of said first, second, and third subtasks being executed subsequent to said static phase of said first, second, and third subtasks, respectively, and responsively to data produced in said static phases, wherein said real-time phase of said third subtask is performed responsively to said request by simulated annealing; and transmitting display data comprising said labeling from a map server to a client.

2. The method according to claim 1, wherein said static phase of said first subtask, said static phase of said second subtask, and said static phase of said third subtask comprise concurrently executing static computer processes, data being exchanged among said static computer processes during performance thereof.

3. The method according to claim 1, wherein said real-time phase of said first subtask, said real-time phase of said second subtask, and said real-time phase of said third subtask comprise concurrently executing real-time computer processes, real-time data produced in said real-time computer processes being exchanged among said real-time computer processes during performance thereof.

4. The method according to claim 3, wherein said real-time computer processes are shared between a first computer and a second computer that is linked to said first computer, said real-time data being exchanged therebetween.

5. The method according to claim 1, wherein simulated annealing further comprises simulated quenching.

6. The method according to claim 1, further comprising the steps of:

determining a number of overlaps between a first label position and other label positions of said labeling identifying a viewport of said map; and culling said candidate positions of said features that fall outside said viewport.

7. The method according to claim 1, further comprising the steps of:
identifying pairs of intersections between said candidate positions; and
thereafter generating a linked list of overlaps among said candidate positions.

8. The method according to claim 7, wherein a count of said overlaps is determined using a sweep line algorithm.

9. The method according to claim 7, wherein a count of said overlaps is determined by counting overlaps between a super bounding box of said one candidate position and super bounding boxes of said other candidate positions of said linked list.

10. The method according to claim 1, wherein said features include an areal feature, and an evaluation of said quality function comprises the steps of:
constructing a polygon that describes said areal feature;
constructing a skeleton of said polygon;
constructing a bounding rectangle of a candidate position of said areal feature; and
determining a distance between a center of said bounding rectangle and said skeleton.

11. The method according to claim 10, wherein said steps of constructing a polygon, constructing a skeleton, and constructing a bounding rectangle are performed during said static phase, further comprising the steps of:
defining a cropped polygon as a portion of said polygon;
thereafter constructing an inset polygon in said cropped polygon; and
determining whether one of said labels of said areal feature, when centered at any point in said inset polygon, lies entirely within said cropped polygon.

12. The method according to claim 11, further comprising the step of computing a medial axis transformation of said polygon.

13. The method according to claim 12, further comprising the steps of decomposing said polygon into a plurality of simple polygons, wherein said medial axis transformation comprises a union of medial axis transformations of said simple polygons.

14. The method according to claim 11, wherein said candidate positions are centered on quasirandom points that are distributed throughout said polygon.

15. A computer software product, including a computer-readable medium in which computer program instructions are stored, which instructions, when read by inter-connected computers, cause the computers to execute a first subtask, a second subtask and a third subtask to thereby automatically annotate features on a map responsively to a request for said map to be displayed, said first subtask, said second subtask and said third subtask each having a static phase and a real-time phase;
said first subtask comprising identifying a set of candidate positions for each label of said features, said static phase of said first subtask being performed prior to accepting said request, said static phase of said first subtask further comprising making a choice of rules for assignment of label attributes from a rule database assigning said label attributes to said candidate positions in accordance with said choice of rules, said label attributes comprising a font size, and a rotational orientation designating a virtual candidate position having a zero size bounding rectangle and having metric parameters such that a cost of a selection of said virtual candidate position in said third subtask is less than a cost of an overlap conflict between said virtual candidate position and others of said candidate positions;
said second subtask comprising for each of said features selecting initial ones of said candidate positions;
said third subtask comprising making an evaluation of different ones of said candidate positions and said virtual candidate position in comparison with said initial ones of said candidate positions to define a labeling, and responsively to said evaluation, replacing at least a portion of said initial ones of said candidate positions with corresponding said different ones of said candidate positions so as to optimize a quality function of said labeling,
wherein said real-time phase of said first, second, and third subtasks are executed subsequent to said static phase of said first, second, and third subtasks, respectively, and responsively to data produced in said static phases, and wherein said real-time phase of said third subtask is performed responsively to said request by simulated annealing.

16. The computer software product according to claim 15, wherein said static phase of said first subtask, said static phase of said second subtask, and said static phase of said third subtask comprise concurrently executing static computer processes, data being exchanged among said static computer processes during performance thereof.

17. The computer software product according to claim 15, wherein said real-time phase of said first subtask, said real-time phase of said second subtask, and said real-time phase of said third subtask comprise concurrently executing real-time computer processes, real-time data produced in said real-time computer processes being exchanged among said real-time computer processes during performance thereof.

18. The computer software product according to claim 17, wherein said real-time computer processes are shared between a first one of said inter-connected computers and a second one of said inter-connected computers, said real-time data being exchanged therebetween.

19. The computer software product according to claim 15, wherein simulated annealing further comprises simulated quenching.

20. The computer software product according to claim 15, further comprising the steps of:
identifying a viewport of said map; and
culling said candidate positions of ones of said features that lie outside said viewport.

21. A system for automatically situating labels on a map, said map having features to be labeled, comprising:
a server operative to perform a first subtask, a second subtask and a third subtask, each having a static phase and a real-time phase the steps of:
in said first subtask, identifying a set of candidate positions for each label of said features, said static phase of said first subtask being performed prior to receiving a request for a map to be displayed, said static phase of said first subtask further comprising:
selecting rules for assignment of label attributes from a rule database;
responsively to said step of selecting rules, assigning said label attributes to said candidate positions, said label attributes comprising a font size, and a rotational orientation; and
designating a virtual candidate position having a zero size bounding rectangle and having metric parameters such that a cost of a selection of said virtual candidate position in said third subtask is less than a cost of an overlap conflict between said virtual candidate position and others of said candidate positions;

in said second subtask, for each of said features selecting initial ones of said candidate positions;

in said third subtask, evaluating different ones of said candidate positions and said virtual candidate position in comparison with said initial ones of said candidate positions to define a labeling; and responsively to said step of evaluating, replacing at least a portion of said initial ones of said candidate positions with corresponding said different ones of said candidate positions so as to optimize a quality function of said labeling; and a client linked to said server and issuing said request, wherein responsively to said request, said server is operative to transmit data descriptive of said map for display by said client, said real-time phase of said first, second, and third subtasks being executed subsequent to said static phase of said first, second, and third subtasks, respectively, and responsively to data produced in said static phases, wherein said real-time phase of said third subtask is performed responsively to said request by simulated annealing.

22. The system according to claim 21, wherein said server is operative to execute concurrently a plurality of static computer processes to perform said static phase of said first subtask, said static phase of said second subtask, and said static phase of said third subtask.

23. The system according to claim 22, wherein said server and said client are operative to execute concurrently a plurality of real-time computer processes so as to jointly perform portions of said real-time phase of said first subtask, said real-time phase of said second subtask, and said real-time phase of said third subtask.

24. The system according to claim 21, wherein simulated annealing further comprises simulated quenching.

25. The system according to claim 21, further comprising the steps of:
identifying a viewport of said map at said client; and
culling said candidate positions of said features that fall outside said viewport.

26. The system according to claim 21, wherein said server is linked to a plurality of remote clients,
said server being operative for wirelessly receiving respective requests from said remote clients for different versions of said map and for concurrently executing instances of said real-time phase of said first subtask, said second subtask, and said third subtask to service said respective requests of said remote clients.

27. The system according to claim 21, wherein said server is linked to a remote client, and said server is operative in said static phase to process stored data that was produced in response to a previous request of said remote client, wherein said request comprises a new display requirement of said remote client that differs from a corresponding display requirement in said previous request, and processing results of said real-time phase comprise an updated map that was generated responsively to said new display requirement, said processing results being wirelessly transmitted from said server to said remote client.

28. The system according to claim 27, wherein said new display requirement comprises a current direction of navigational advance of said remote client.

* * * * *